(No Model.)
J. S. GALL.
WATER TRAP CLEANER.
No. 267,306. Patented Nov. 7, 1882.
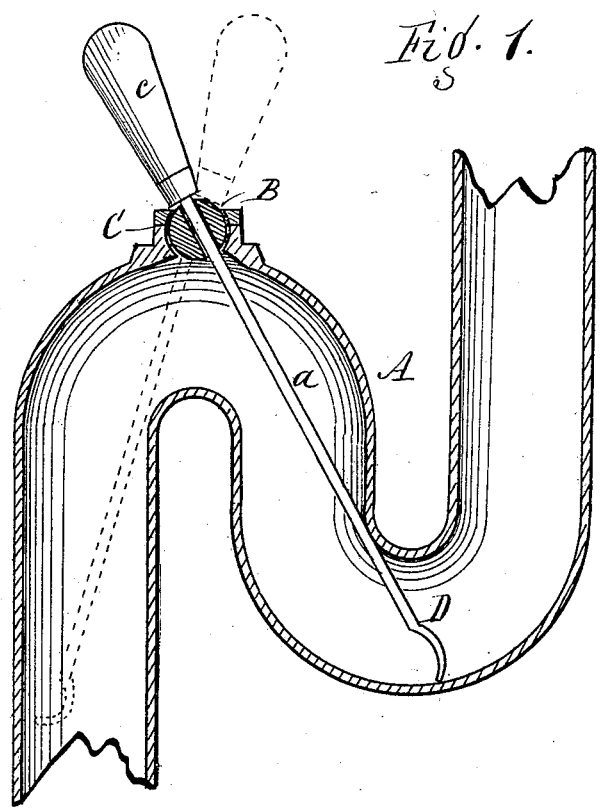
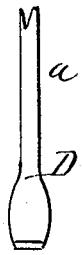
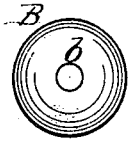
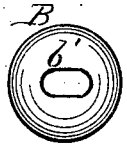
Attest
W. Crawford
E. P. Follett
Inventor.
John S. Gall.
per R. F. Osgood,
atty

UNITED STATES PATENT OFFICE.

JOHN S. GALL, OF ROCHESTER, NEW YORK, ASSIGNOR OF ONE-HALF TO JOHN W. ORPHY, OF SAME PLACE.

WATER-TRAP CLEARER.

SPECIFICATION forming part of Letters Patent No. 267,306, dated November 7, 1882.

Application filed April 17, 1882. (No model.)

*To all whom it may concern:*

Be it known that I, JOHN S. GALL, of Rochester, Monroe county, New York, have invented a certain new and useful Improvement in Water-Trap Clearers; and I do hereby declare that the following is a full, clear, and exact description of the same, reference being had to the accompanying drawings, in which—

Figure 1 is a longitudinal vertical section of a water-trap showing my improvement. Fig. 2 is an elevation of the lower end of the fork or paddle by which the trap is cleared. Fig. 3 is a plan of the ball. Fig. 4 is a similar view of the ball, but showing a modification.

My improvement relates to devices for clearing water-traps of solid matter which collects in the bends, and is specially adapted to the traps of water-closets, which are very liable to get clogged up and stopped by paper and other solid matters which pass into the trap.

The invention consists in the combination of a ball seated in a socket at the top of the trap and having a free turning movement therein, and a fork or paddle whose shaft passes through a hole in the ball, said fork or paddle having a free end movement in the ball, and serving to catch onto and hold the material in one bend of the trap and raise it over into the other bend, where it is discharged through the exit-pipe, all as hereinafter described.

In the drawings, A shows a bent water-trap of ordinary form, such as is used in water-closets and for other purposes.

B shows a ball, which is seated in a socket, C, on the top bend of the trap, and which is allowed a free turning movement.

D is a fork or paddle, whose shaft $a$ passes through a hole, $b$, in the ball, and has a free end movement therein, so that it can be pushed in or drawn out. At the lower end is the fork or paddle, while at the upper end and outside the ball is a handle, $c$, of any convenient form, by which the device is operated.

The operation is as follows: When the lower or induction bend of the trap becomes obstructed with solid matter the fork is thrown over to that side, as shown at the right in Fig. 1, and in that position hold is obtained upon the obstruction, and the same can be raised by drawing the fork up till the top bend is reached, when the fork can be thrown over into the discharge end of the pipe, as shown by dotted lines at the left in Fig. 1. In fact, the fork acts as a sort of scoop to catch upon the waste matter in the trap, raise it up, and throw it over into the discharge. Considerable range of motion is obtained in catching upon the material, so that the trap is easily cleared out. When not in use the fork lies over on the discharge side of the trap, as shown by dotted lines, Fig. 1.

If desired, the fork may be made removable from the trap when not in use by making an elongated hole, $b'$, in the ball, Fig. 4, through which the fork may be inserted and withdrawn. In such case the fork can be inserted at any time when it is necessary to clear the trap and then be withdrawn, the ball being then turned in its socket, so that the slot $b'$ will be closed to prevent the escape of water.

The ball may be made of brass or other metal, rubber, or any other material adapted to the purpose.

Instead of the hook form given to the lower end of the fork, it may be made of any other desired form.

Having thus described my invention, what I claim as new is—

1. The combination, with an S-trap, of a shaft forming a fork or paddle, passing through a rolling or self-adjusting bearing at the top bend of the trap, said shaft having end movement in the bearing and being capable of being inserted in the lower bend of the trap, of being elevated therefrom, and of being thrown over into the discharge end of the trap, as set forth.

2. The combination, with an S-trap, of the ball B and socket C in the top bend of the trap, and the fork or paddle D, provided with a shaft, $a$, which passes through a hole in the ball, the ball being capable of rotary movement in its socket and the shaft capable of end movement in the ball, as herein shown and described.

In witness whereof I have hereunto signed my name in the presence of two subscribing witnesses.

JOHN S. GALL.

Witnesses:
R. F. OSGOOD,
Z. L. DAVIS,